US 9,677,466 B2

(12) United States Patent
Smaoui et al.

(10) Patent No.: US 9,677,466 B2
(45) Date of Patent: Jun. 13, 2017

(54) METHOD OF MANAGING A POWER DEMAND FOR THE OPERATION OF A PILOTLESS AIRCRAFT EQUIPPED WITH AN INTERNAL COMBUSTION ENGINE

(71) Applicant: AIRBUS GROUP SAS, Blagnac (FR)

(72) Inventors: Hichem Smaoui, Paris (FR); Bruno Rechain, Paris (FR); Fabien Retho, Carbonne (FR)

(73) Assignee: AIRBUS GROUP SAS, Blagnac (FR)

( * ) Notice: Subject to any disclaimer, the term of this patent is extended or adjusted under 35 U.S.C. 154(b) by 0 days.

(21) Appl. No.: 14/966,180

(22) Filed: Dec. 11, 2015

(65) Prior Publication Data
US 2016/0167799 A1 Jun. 16, 2016

(30) Foreign Application Priority Data
Dec. 16, 2014 (EP) .................... 14307051

(51) Int. Cl.
*F02B 65/00* (2006.01)
*B64C 39/02* (2006.01)
(Continued)

(52) U.S. Cl.
CPC ............... *F02B 65/00* (2013.01); *B60K 6/24* (2013.01); *B60K 6/387* (2013.01); *B60K 6/40* (2013.01); *B60K 6/442* (2013.01); *B64C 39/024* (2013.01); *F01D 15/10* (2013.01); *F02B 33/40* (2013.01); *F02B 37/00* (2013.01); *F02C 6/12* (2013.01); *F02C 6/14* (2013.01); *F02C 6/206* (2013.01); *B64C 2201/024* (2013.01); *B64C 2201/042* (2013.01); *B64C 2201/048* (2013.01); *B64D 2027/026* (2013.01); *F05D 2220/329* (2013.01); *F05D 2220/40* (2013.01); *F05D 2220/62* (2013.01); *F05D 2220/76* (2013.01); *F05D 2220/90* (2013.01); *F05D 2260/42* (2013.01);
(Continued)

(58) Field of Classification Search
CPC . B60K 6/24; B60K 6/387; B60K 6/40; B60K 6/442; B64C 39/024; B64C 2201/024; B64C 2201/042; B64C 2201/048; F02B 65/00; F02B 33/40; F02B 37/00; F01D 15/10; F02C 6/12; F02C 6/14; F02C 6/206; B64D 2027/026; F05D 2220/329; F05D 2220/40; F05D 2220/62; F05D 2220/76; F05D 2220/90
See application file for complete search history.

(56) References Cited

U.S. PATENT DOCUMENTS

2015/0197242 A1* 7/2015 Yamazaki ............ B60W 20/30
701/22
2015/0285122 A1* 10/2015 Yamashita ............ F02B 37/00
60/618

(Continued)

Primary Examiner — Aaron L Troost
(74) Attorney, Agent, or Firm — Im IP Law; C. Andrew Im

(57) ABSTRACT

A method of managing a power demand to assure the operation of a pilotless aircraft. The aircraft includes an internal combustion engine supplying a maximum principal power which can vary. The management method is particularly suitable for a rotary wing pilotless aircraft. It guarantees the storage of an amount of electrical energy at least equal to a recovery energy of the aircraft in the event of failure of the internal combustion engine. This recovery energy enables the control of autorotation and landing of the aircraft.

16 Claims, 2 Drawing Sheets

(51) Int. Cl.
*F02B 37/00* (2006.01)
*F02B 33/40* (2006.01)
*F01D 15/10* (2006.01)
*F02C 6/12* (2006.01)
*F02C 6/14* (2006.01)
*F02C 6/20* (2006.01)
*B60K 6/24* (2007.10)
*B60K 6/38* (2007.10)
*B60K 6/40* (2007.10)
*B60K 6/44* (2007.10)
*B60K 6/387* (2007.10)
*B60K 6/442* (2007.10)
*B64D 27/02* (2006.01)

(52) U.S. Cl.
CPC ........ *Y02T 10/6234* (2013.01); *Y02T 10/6295* (2013.01); *Y02T 50/64* (2013.01); *Y02T 50/671* (2013.01)

(56) References Cited

U.S. PATENT DOCUMENTS

2015/0285165 A1* 10/2015 Steinwandel .......... B64D 27/02
　　　　　　　　　　　　　　　　　　　　244/55
2016/0137304 A1* 5/2016 Phan .................. B64D 27/02
　　　　　　　　　　　　　　　　　　　　244/17.23

* cited by examiner

METHOD OF MANAGING A POWER DEMAND FOR THE OPERATION OF A PILOTLESS AIRCRAFT EQUIPPED WITH AN INTERNAL COMBUSTION ENGINE

RELATED APPLICATIONS

This application claims priority from European Patent Application No. EP14307051.4 filed Dec. 16, 2015, which is herein incorporated by reference in its entirety.

BACKGROUND OF THE INVENTION

Field of the Invention

The present invention concerns a method of managing a power demand for the operation of a rotary wing pilotless aircraft equipped with an internal combustion engine.

It further concerns a rotary wing pilotless aircraft provided with a turboshaft engine for implementing this management method.

Technological Background

There are known rotary wing machines including a single power unit for driving at least one rotor of the rotary wing system.

Such a power unit is then rated to supply the necessary power to the machine in order to propel it and/or support it.

It is sometimes necessary for this power unit to be an internal combustion engine of the DIESEL engine type for applications where certain fuels such as petrol cannot be used.

Now, the DIESEL engine offer for the aeronautical market is very limited, which sometimes involves use on aircraft of motor vehicle engines—of great reliability—but the power of which is not always suited to the aircraft and/or the power density of which is generally limited.

Moreover, on a vertical take-off and landing drone, the power demand is often maximum in the take-off and hovering phases, which are of relatively short duration in many missions.

It is therefore often necessary to "boost" the initial power of the engine to achieve acceptable installed performance.

Adding a turbocharger to the existing engine is a solution generally used to apply additional power to the driveshaft.

This turbocharger makes it possible to feed boost air to the inlet of the pistons, thereby significantly increasing the power developed by the engine.

Modification of the injection laws is also a way of increasing the power of the engine.

In both these cases it is necessary to ensure that the limit parameters of the engine (turbocharger turbine inlet temperature, crankcase pressure) are not impacted by these modifications or that the latter authorize a minimum service life of the engine.

Such a solution may also require more costly modifications to the engine cooling system, seals, etc.

Be this as it may, it is found that these solutions may prove insufficient to assure optimum functioning of the rotary wing machine, the maximum power delivered by a DIESEL engine being variable and dependent on the altitude of the machine and the temperature conditions.

These maximum available power variations are sufficiently large that they have to be taken into consideration and a dynamic strategy defined.

Also known is the use on some aircraft of a thermal auxiliary power unit (APU).

Such auxiliary power units are generally used to supply power to auxiliary circuits such as hydraulic or pneumatic circuits and are never used to drive a gearbox of at least one rotor on a rotary wing aircraft.

Moreover, if the single power unit of the rotary wing machine fails, that machine having no redundant safety elements to take over without interruption of service, the machine crashes in an uncontrolled manner.

There is therefore a considerable requirement to guarantee that a rotary wing machine in service can land safely in the event of failure of its power unit.

The present invention aims to overcome the various drawbacks described above by proposing a method of managing a power demand to assure the operation of a drone type rotary wing machine that is of particularly simple design and particularly simple to operate, reliable and economical, and capable of taking into account dynamically the variations in the maximum power supplied by the main engine of that machine.

Another object of the present invention is such a method assuring recovery of the machine in the event of failure of its main power unit, the machine embodying no redundancy.

A further object of the invention is a rotary wing aircraft such as a vertical take-off and landing (VTOL) drone, the original layout of the propulsion system of which allows the implementation of this method of managing a power demand.

BRIEF DESCRIPTION OF THE INVENTION

To this end, the invention concerns a method, said aircraft including an internal combustion engine supplying a maximum principal power $P_M$ liable to vary.

In accordance with the invention, in the absence of failure of said internal combustion engine, the following steps are carried out:

a) collecting at least some of the exhaust gases when this internal combustion engine is operating, b) feeding a turbine with the energy of the gases collected in this way, c) producing an electrical current by means of an electrical generator connected to said turbine, and d) comparing the maximum principal power $P_M$ supplied by said internal combustion engine at the time of the power demand with the demanded power $P_D$, e) if the maximum principal power $P_M$ is at least equal to the demanded power $P_D$, storing at least some of the electrical energy generated in this way in at least one energy storage unit and/or using at least some of the electrical energy generated in this way to assist the internal combustion engine by supplying an auxiliary power $P_A$ complementing a main power $P_t$ developed by the internal combustion engine, with $P_t$ less than $P_M$, so that $P_A + P_t = P_D$, or f) if the maximum principal power $P_M$ is less than the power $P_D$ demanded for the operation of said aircraft, using at least some of the electrical energy generated in this way to assist the internal combustion engine to provide the demanded power $P_D$ or using at least some of the electrical energy stored in said at least one energy storage unit to assist the internal combustion engine to supply the demanded power $P_D$, or g) if the demanded power $P_D$ is greater than the sum of the maximum principal power $P_M$ developed by the internal combustion engine and the auxiliary power that can be supplied by said at least one storage unit, modifying the operation of said aircraft so as to be able to supply said demanded power $P_D$ in accordance with one of the steps e) or f).

This management method therefore offers a global method of managing the power demanded for the operation of a pilotless aircraft, notably a rotary wing drone.

This method of managing a power demand is particularly advantageous assuming that it is required to increase the installed power of a vertical take-off and landing drone. The additional mass linked to the use of new equipments/systems is compensated by an improvement in overall efficiency at the level of the propulsion system and a possibility of recovering the drone in the event of an engine problem.

The increase in the installed power makes it possible either to carry more fuel in order to increase the autonomy of the drone or to carry a greater payload, more safely.

The internal combustion engine being a piston engine, the turbine used in the step b) is advantageously an additional turbine that is not part of or connected to the internal combustion engine. This additional turbine is advantageously placed downstream of the turbine of the turbocharger.

Said at least one energy storage unit is chosen in the group comprising an electrical battery, a supercapacitor, etc.

In different particular embodiments of this management method, each having its particular advantages and lending itself to numerous possible technical combinations:

in the step e), using at least some of the electrical energy stored in said at least one energy storage unit to assist said internal combustion engine, an additional compressor of said internal combustion engine is fed and/or an electric motor developing an auxiliary power $P_A$ is fed.

Accordingly, with the electrical energy stored in said at least one energy storage unit, it is possible to supply power to a second compressor enabling the cylinder pressure in the internal combustion engine to be increased to apply additional power $P_A$ to the driveshaft and/or to supply power to an electric motor connected to the main gearbox of the pilotless aircraft (additional engine torque).

said aircraft being a rotary wing aircraft, to regulate the stored electrical energy so that it is always at least equal to a recovery energy of the aircraft in the event of failure of said internal combustion engine.

This management of the recuperation energy can therefore impose the choice of one of the possible actions defined in steps e) and f), before the steps e) and f), to determine the state of charge SOC of each energy storage unit.

Of course, the pilotless aircraft can include one or more storage units, for example one or more electrical batteries.

If the pilotless aircraft includes a plurality of electrical energy storage units, the storage capacity of this energy storage system is then equal to the sum of the individual storage capacities of or specific to each storage unit.

Remember that the state of charge (SOC) of a battery represents the quantity of electricity (expressed in Ah) stored in said battery normalized by the maximum quantity, or nominal capacity, that can be stored after complete charging of that battery.

Preferably, said aircraft being a rotary wing aircraft including N electrical energy storage units, with N>1, the capacity of a first storage unit is allowed to be less than or equal to a threshold value Vs/N where Vs corresponds to a recovery energy of the aircraft in the event of failure of said internal combustion engine, in the step f), if the sum of the remaining capacities in the (N−1) other storage units is greater than or equal to Vs.

Of course, when a step e) is used, priority is given to recharging this storage unit, the capacity of which is less than said threshold value Vs/N so as to return this capacity to a value greater than or equal to Vs/N.

said pilotless aircraft being a rotary wing aircraft including at least two rotors, if said internal combustion engine has failed, to disengage the mechanical coupling of said rotors to assure free rotation of these rotors and autorotation of the aircraft.

This pilotless aircraft is preferably configured to disengage automatically the mechanical coupling of each rotor in the event of said internal combustion engine stopping.

This mechanical coupling may be a dog clutch or a friction clutch.

The descent in autorotation and landing of the aircraft in the event of a failure of the internal combustion engine are preferably controlled using at least some of the electrical energy stored in said at least one storage unit to supply to said aircraft the power demanded to effect this control.

said aircraft being on the ground, to use at least some of the electrical energy stored in said at least one storage unit to supply to said aircraft the power demanded, the internal combustion engine being stopped, in the step e), the storage of at least some of the electrical energy generated in this way in at least one energy storage unit is sequential or non-sequential.

It is therefore possible to charge one storage unit at a time or all these storage units simultaneously if their respective capacity is not already at their nominal value (100% state of charge SOC).

in the step g) at least one of the following actions is carried out: reducing the altitude of the aircraft, modifying the speed of the aircraft.

This aircraft advantageously includes altitude determination means making it possible to evaluate the altitude at which this aircraft is flying. It is therefore possible to fix a given altitude threshold As below which the aircraft may not descend, for example because of the presence of known obstacles (wall, house, etc.) or assumed obstacles (aircraft flying over terrain whose natural relief (trees, etc.) is difficult to predict). Taking this threshold altitude As into account then impacts on the step g). The reduction of the altitude could be accompanied by another action to reduce the power $P_M$ demanded such as a modification of the speed if reducing only the altitude of the aircraft would bring the aircraft to an estimated altitude below this threshold altitude.

These means for determining the altitude of the pilotless aircraft include at least one barometric sensor making it possible to measure the pressure variations during the flight, which variations correlate with the altitude variations.

The present invention also concerns a rotary wing pilotless aircraft for implementing the method described above of managing a power demand, said aircraft including a supercharged internal combustion engine to drive said rotary wing system, said internal combustion engine including a first compressor and supplying a maximum principal power to assure at least the driving of said rotary wing system, said maximum principal power being liable to vary.

In accordance with the invention, this aircraft comprises:
a system for recovery of thermal energy and conversion of that thermal energy into electrical energy, this system including means for collecting at least some of the exhaust gases when the internal combustion engine is operating and feeding a turbine with said exhaust gases collected in this way to convert the energy of these gases collected in this way into mechanical energy, an electrical generator fed by this turbine to produce electrical energy, at least one electrical energy storage unit configured to store at least some of the electrical energy produced in this way, a propulsion control unit making it possible to determine the maximum principal power supplied by said internal combustion engine at the time of a power demand and to manage the electrical energy generated in this way to meet the power demand as a function of the power demanded to at least drive said rotary wing, and the maximum power supplied by said internal combustion engine.

This supercharged internal combustion engine developing a maximum principal power $P_M$ is connected to a main gearbox to cause the latter to rotate so as to drive in rotation at least one rotor of the rotary wing system.

This internal combustion engine is preferably a diesel engine.

Said internal combustion engine preferably includes a second compressor configured to be fed with electrical energy by said electrical energy storage unit or at least one of said electrical energy storage units. This second compressor is therefore an electrical compressor.

Additionally, or alternatively, this aircraft includes an electric motor configured to be fed with electrical energy by said electrical energy storage unit or at least one of said electrical energy storage units, said electric motor being connected to the main gearbox to which said internal combustion engine is connected.

These elements notably make it possible to provide additional power to assist the internal combustion engine.

This rotary wing aircraft including at least two rotors, it advantageously includes means for disengaging the mechanical coupling of said rotors so as to assure free rotation of these rotors if said internal combustion engine has failed.

This aircraft preferably includes a system for managing the state of charge of each electrical energy storage unit to have available at all times a recovery energy of the aircraft in the event of failure of said internal combustion engine.

BRIEF DESCRIPTION OF THE DRAWINGS

Other advantages, objects and particular features of the present invention will emerge from the following description given by way of nonlimiting explanation only and with reference to the appended drawings, in which.

DETAILED DESCRIPTION OF EMBODIMENTS OF THE INVENTION

It will first be noted that the figures are not to scale.

Figure 1:
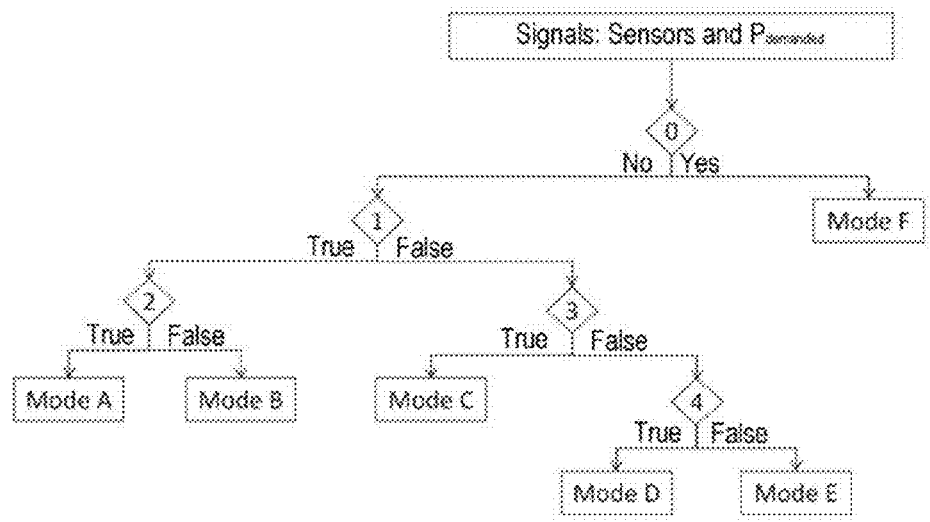
FIG. 1 is a diagrammatic view of the decision tree used in accordance with one particular embodiment of the present invention by software in the propulsion control unit (PCU) to manage a power demand to assure the operation of a VTOL drone.

FIG. 1 is a diagrammatic view of the decision tree used in accordance with one particular embodiment of the present invention by appropriate software in the propulsion control unit (PCU) to manage a power demand to assure the operation of a VTOL drone.

That drone includes an energy storage unit the feeding of which with electrical energy and the output of this electrical energy to the driveshaft are managed by the propulsion control unit (PCU).

This strategy for assuring the management of a power demand is described here in the form of a decision tree comprising five (5) tests and six (6) modes of operation.

A first test (TEST 0) evaluates the operating status of the internal combustion engine by means of various sensors placed on it. If these sensors send signals indicating failure of the latter engine, a safe mode (MODE F) is triggered to provide additional electrical power directly from the energy storage unit in order to enable selection of assisted autorotation and a soft landing of the drone.

The second test (TEST 1) verifies if the internal combustion engine is able to supply a maximum power at least equal to the power demanded to satisfy the demand:
 If yes, the internal combustion engine can, following a test (TEST 2) on the state of charge of the energy storage unit:
  be assisted by a system for recovery of thermal energy and conversion of that thermal energy into electrical energy, and thus function under the power demand to reduce its consumption (MODE A, SOC equal to the maximum limit), or
  supply all of the power demanded. The power recovered by the system for recovering thermal energy and converting that thermal energy into electrical energy at the level of the exhaust gases is then used to recharge the energy storage unit (MODE B, SOC less than the maximum limit).
 If the maximum power developed by the engine at the moment of the power demand is less than the power demanded, then:
  if the total combined power of the internal combustion engine at full load and the electrical energy obtained from the recovery of heat energy at the level of the exhaust gases is sufficient (TEST 3), the internal combustion engine is complemented by this electrical power generated by the system for recovering thermal energy and converting that thermal energy into electrical energy (MODE C),
  if the state of charge (SOC) of the energy storage unit is greater than a threshold value corresponding to a recovery energy of the drone in the event of failure of the engine and if the total combined power of the internal combustion engine at full load and that delivered by the energy storage unit is sufficient (TEST 4), the internal combustion engine is complemented by the electrical power delivered by the energy storage unit (MODE D),
  if TEST 4 fails, the drone switches to a safe mode aiming to reduce the power demand by a modification of the mission. This modification implies manoeuvres (descent, modification of speeds, etc.) reducing the power demand (MODE E).

This mode is temporary and does not impose an emergency landing.

This internal combustion engine being a piston engine, this system for recovering thermal energy and converting that thermal energy into electrical energy here comprises:
 means for collecting at least some of the exhaust gases when the internal combustion engine is operating and feeding a turbine directly with said exhaust gases collected in this way to convert the residual energy of these gases collected in this way into mechanical energy, and an electrical generator fed by this turbine to produce electrical energy.

Figure 2:
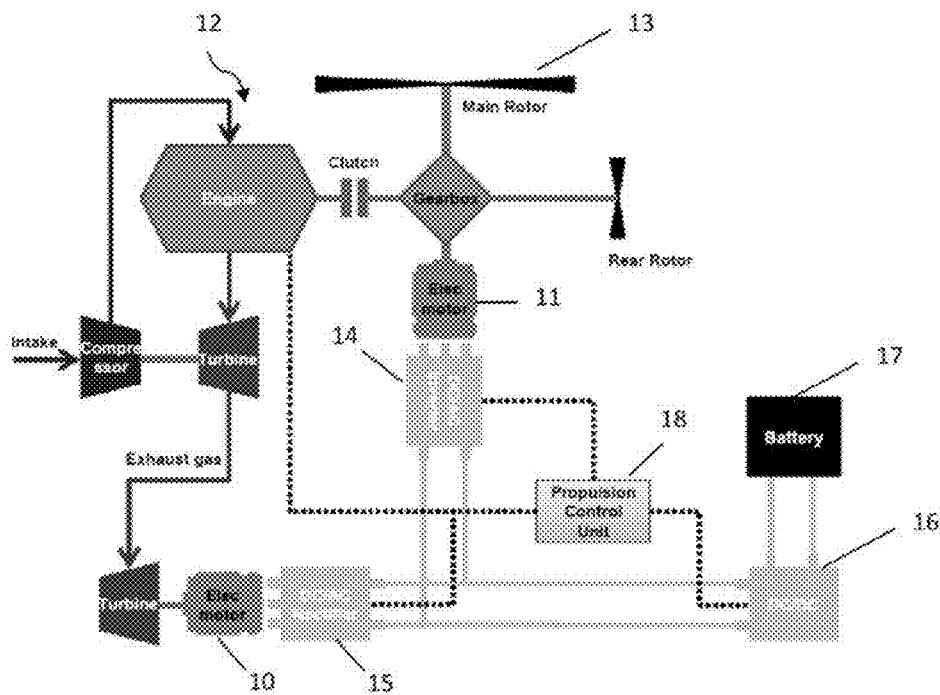
FIG. 2 is a highly diagrammatic view of a hybrid power generation system drone in accordance with a first embodiment of the invention for a VTOL.
Figure 3:
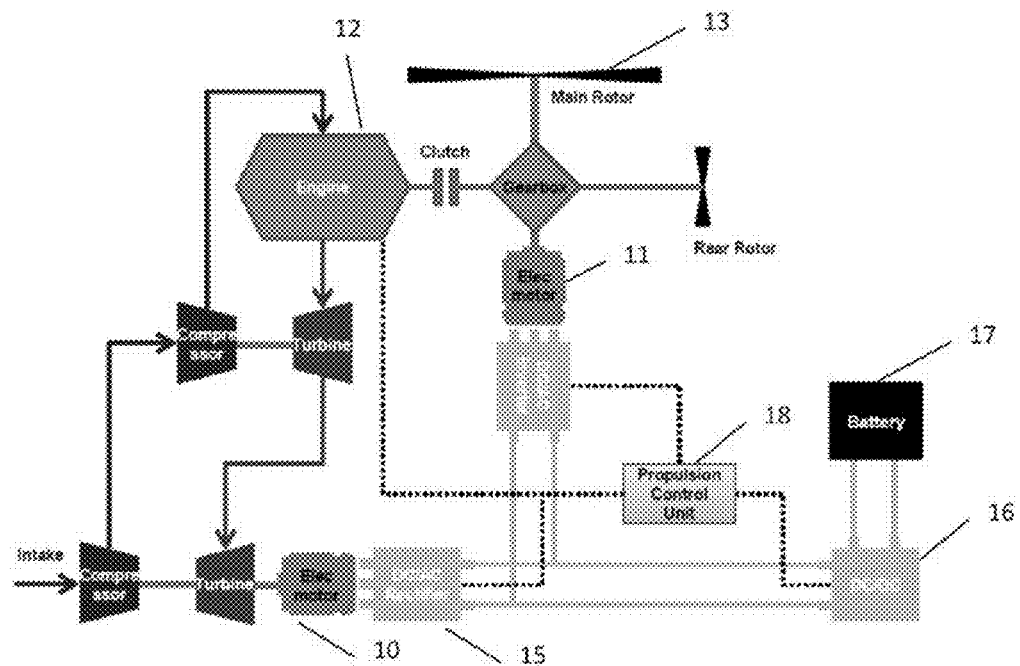
FIG. 3 is a highly diagrammatic view of a hybrid power generation system in accordance with a second embodiment of the invention for a VTOL drone.
Figure 4:
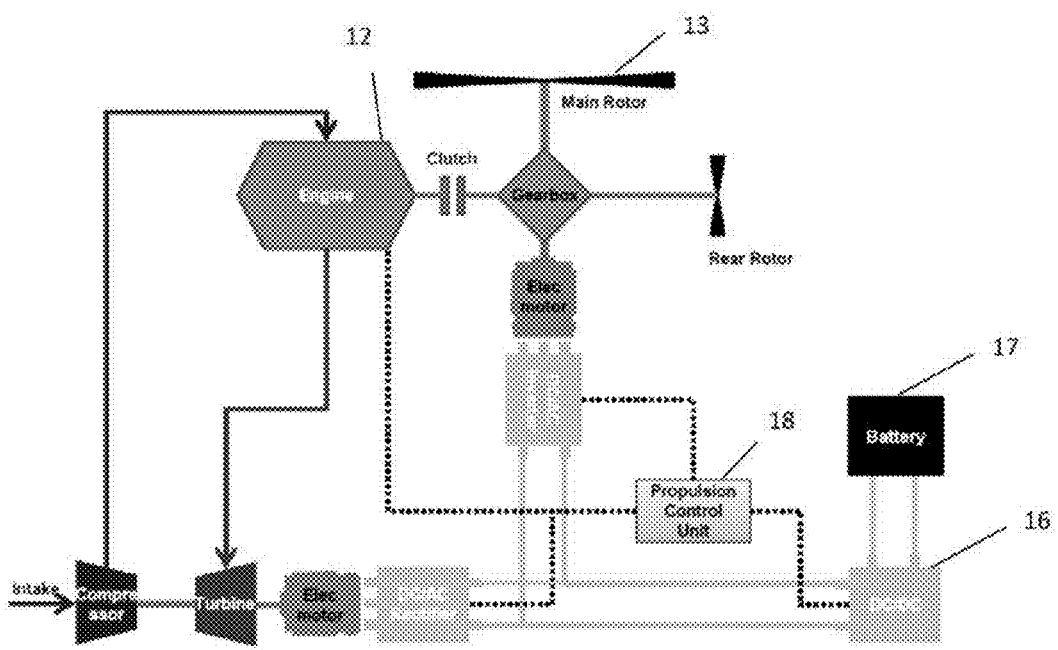
FIG. 4 is a highly diagrammatic view of a hybrid power generation system in accordance with a third embodiment of the invention for a VTOL drone.

As shown in FIGS. 2 to 4, the electrical subsystem of the hybrid power generation system of the drone here comprises:

an electric motor/alternator 10 operating at high speed (rotation speed of a turbo), an electric motor/alternator 11 connected to the mechanical transmission between the engine 12 and the main rotor 13, two AC/DC converters 14, 15, a DC/DC converter 16, an energy storage unit 17 comprising a plurality of batteries or supercapacitors for storing electrical energy and its control electronics making it possible to monitor the state of charge and of health of this electrical energy storage unit, a propulsion control unit (PCU) 18 making it possible to manage the flows of electrical energy as a function of the power demand and the state of charge of the battery.

The electric motor/alternator 10 operating at high speed (rotation speed of a turbo) is able to supply mechanical power to or recover mechanical power from the turbocharger shaft of the diesel engine 12.

The electric motor/alternator 11 connected to the mechanical transmission between the engine 12 and the main rotor 13 makes it possible to supply mechanical power to the rotors of the VTOL drone.

The two AC/DC converters 14, 15 make it possible to convert direct current electrical power into alternating current electrical power and vice versa.

The DC/DC converter 16 makes it possible to regulate the current feeding the energy storage unit during charging.

The energy storage units 17 makes it possible to store or output electrical power to/from the electric motors/alternators.

The invention claimed is:

1. Method of managing a power demand to assure operation of a pilotless aircraft, the aircraft comprising an internal combustion engine supplying a maximum principal power $P_M$, which can vary, the method comprises the steps of, in the absence of an internal combustion engine failure:

a) collecting at least some of exhaust gases during an operation of the internal combustion engine;

b) feeding a turbine with an energy of the exhaust gases collected;

c) producing an electrical current using an electrical generator connected to the turbine to generate an electrical energy;

d) comparing the maximum principal power $P_M$ supplied by the internal combustion engine with a demanded power $P_D$ at a time of the power demand;

e) in response to a determination that the maximum principal power $P_M$ is at least equal to the demanded power $P_D$ for an operation of the pilotless aircraft, performing at least one of storing at least some of the electrical energy generated in at least one energy storage unit and utilizing said at least some of the electrical energy generated to assist the internal combustion engine by supplying an auxiliary power $P_A$ complementing a main power $P_t$ developed by the internal combustion engine, with $P_t$ less than $P_M$, so that $P_A + P_t = P_D$;

f) in response to a determination that the maximum principal power $P_M$ is less than the demanded power $P_D$ for the operation of the pilotless aircraft, utilizing said at least some of the electrical energy generated to assist the internal combustion engine to provide the demanded power $P_D$ or utilizing at least some of the electrical energy stored in said at least one energy storage unit to assist the internal combustion engine to supply the demanded power $P_D$;

g) in response to a determination that the demanded power $P_D$ is greater than the sum of the maximum principal power $P_M$ developed by the internal combustion engine and the auxiliary power that can be supplied by said at least one energy storage unit, modifying the operation of the pilotless aircraft to supply the demanded power $P_D$ in accordance with one of the steps e) or f); and h) in response to a determination that the pilotless aircraft is on the ground and the internal combustion is stopped, supplying the demanded power $P_D$ to the pilotless aircraft utilizing said at least some of the electrical energy stored in said at least one storage unit.

2. Method according to claim 1, wherein the step of utilizing said at least some of the electrical energy stored in said at least one energy storage unit to assist the internal combustion engine in step e), further comprises the step of feeding at least one of a compressor of the internal combustion engine and an electric motor developing an auxiliary power $P_A$.

3. Method according to claim 1, wherein the pilotless aircraft is a rotary wing aircraft; and further comprising the step of regulating the stored electrical energy to be at least equal to a recovery energy of the pilotless aircraft in the event of the internal combustion engine failure.

4. Method according to claim 3, wherein the pilotless aircraft comprises N electrical energy storage units, with N>1; and further comprising the step of adjusting a capacity of a first storage unit to be less than or equal to a threshold value Vs/N where Vs corresponds to the recovery energy of the pilotless aircraft in the event of the internal combustion engine failure, in response to a determination, in step f), that a sum of remaining capacities in other N−1 storage units is greater than or equal to Vs.

5. Method according to claim 1, before the steps e) and f), further comprising the step determining a state of charge for each energy storage unit.

6. Method according to claim 5, wherein the pilotless aircraft is a rotary wing aircraft comprising N electrical energy storage units, with N>1; and further comprising the step of adjusting a capacity of a first storage unit to be less than or equal to a threshold value Vs/N where Vs corresponds to a recovery energy of the pilotless aircraft in the event of the internal combustion engine failure, in response to a determination, in step f), that a sum of remaining capacities in other N−1 storage units is greater than or equal to Vs.

7. Method according to claim 1, wherein the pilotless aircraft is a rotary wing aircraft comprising at least two rotors; and further comprising the step of disengaging a mechanical coupling of each rotor to assure a free rotation of said at least two rotors and an autorotation of the pilotless aircraft in an event of the internal combustion engine failure.

8. Method according to claim 7, further comprising the step of supplying a demanded power to the pilotless aircraft to control a descent in the autorotation and landing of the pilotless aircraft in the event of the internal combustion engine failure utilizing said at least some of the electrical energy stored in said at least one storage unit.

9. Method according to claim 7, further comprising the step of automatically disengaging the mechanical coupling of said each rotor in the event of a stoppage of the internal combustion engine.

10. Method according to claim 9, further comprising the step of supplying a demanded power to the pilotless aircraft to control a descent in the autorotation and landing of the pilotless aircraft in the event of the internal combustion engine failure utilizing said at least some of the electrical energy stored in said at least one storage unit.

11. Method according to claim 1, wherein the step of modifying the operation of the pilotless aircraft comprises at least one of the following actions: reducing an altitude of the pilotless aircraft and modifying a speed of the pilotless aircraft.

12. Rotary wing pilotless aircraft, comprising:
a supercharged internal combustion engine to drive a rotary wing system, the internal combustion engine comprises a first compressor, the internal combustion engine is configured to drive the rotary wing system and to supply a maximum principal power, which can vary, to assure at least the driving of the rotary wing system; and
a recovery system to recover a thermal energy and convert the recovered thermal energy into an electrical energy, the recovery system comprises a collector to collect at least some of exhaust gases during an operation of the internal combustion engine, a turbine fed with the exhaust gases collected to convert an energy of the exhaust gases collected into a mechanical energy; and an electrical generator fed by the turbine to produce an electrical energy;
at least one energy storage unit configured to store at least some of the electrical energy produced by the recovery system;
a propulsion control unit configured to determine a maximum principal power $P_M$ supplied by the internal combustion engine at the time of a power demand $P_D$ and to manage generation of the electrical energy to meet the power demand as a function of the power demand to at least drive the rotary wing and the maximum power supplied by the internal combustion engine;
wherein in response to a determination that the maximum principal power $P_M$ is at least equal to the power demand $P_D$ for an operation of the rotary wing pilotless aircraft, the propulsion control unit is configured to control at least one of the following: said at least one energy storage unit to store at least some of the electrical energy generated by the electrical generator, and the recovery system to utilize said at least some of the electrical energy generated by the electrical generator to assist the internal combustion engine by supplying an auxiliary power $P_A$ complementing a main power $P_t$ developed by the internal combustion engine, with $P_t$ less than $P_M$, so that $P_A+P_t=P_D$;
wherein in response to a determination that the maximum principal power $P_M$ is less than the power demand $P_D$ for the operation of the rotary wing pilotless aircraft, the propulsion control is configured to control the recovery system to utilize said at least some of the electrical energy generated by the electrical generator to assist the internal combustion engine to provide the power demand $P_D$, or said at least one energy storage unit to supply the auxiliary power $P_A$ to assist the internal combustion engine in supplying the power demand $P_D$;
wherein in response to a determination that the power demand $P_D$ is greater than the sum of the maximum principal power $P_M$ developed by the internal combustion engine and the auxiliary power that can be supplied by said at least one energy storage unit, the propulsion control unit is configured to modify the operation of the rotary wing pilotless aircraft to supply the power demand $P_D$; and
wherein in response to a determination that the rotary wing pilotless aircraft is on the ground and the internal combustion is stopped, the power demand $P_D$ is supplied to the rotary wing pilotless aircraft utilizing said at least some of the electrical energy stored in said at least one storage unit.

13. Rotary wing pilotless aircraft according to claim 12, wherein the internal combustion engine comprises a second compressor configured to be fed with the electrical energy from said at least one energy storage unit.

14. Rotary wing pilotless aircraft according to claim 12, further comprising a main gearbox connected to the internal combustion engine, and an electric motor configured to be fed with the electrical energy from said at least one energy storage unit, the electric motor is connected to the main gearbox.

15. Rotary wing pilotless aircraft according to claim 12, further comprising at least two rotors and a device to disengage a mechanical coupling of each rotor to assure a free rotation of said at least two rotors in an event of an internal combustion engine failure.

16. Rotary wing pilotless aircraft according to claim 12, further comprising a system to manage a state of charge of each energy storage unit to have available at all times a recovery energy of the rotary wing pilotless aircraft in the event of an internal combustion engine failure.

* * * * *